UNITED STATES PATENT OFFICE.

EDUARD JOSEPH, OF BERLIN, GERMANY.

PROCESS OF MANUFACTURING FODDER COMPOSED OF PEAT AND MOLASSES.

1,022,243.   Specification of Letters Patent.   Patented Apr. 2, 1912.

No Drawing.   Application filed October 15, 1909. Serial No. 522,850.

*To all whom it may concern:*

Be it known that I, EDUARD JOSEPH, manufacturer, citizen of Germany, subject of the King of Prussia and Emperor of Germany, residing at Berlin, in the Kingdom of Prussia and Empire of Germany, have invented new and useful Improvements in Processes of Manufacturing Fodder Composed of Peat and Molasses, of which the following is a specification.

My invention relates to processes of manufacturing fodder composed of peat and molasses having an admixture of alkali.

When making fodder of peat and molasses or the like it has repeatedly been proposed heretofore to add alkali to the food mixture. This well-known process is based on the observation that the acid nature of fodder composed of peat and molasses may act disadvantageously, and it was supposed that this action was attributable to the acid produced generally subsequently in consequence of fermentation in the molasses or the like. Now experiments have shown that it is not these acids freshly formed for any reason after the manufacture of the mixed food which cause the disadvantageous action, but rather the humic acids of the peat. Namely, it has been found that the acids formed from the molasses or the like consists solely of lactic and similar acids; but of these acids it is known for a certainty that they have no prejudicial influence on the animal organism, but, on the contrary, are capable of substituting the hydrochloric acid in digestion. Proceeding from this knowledge, according to my process I completely deprive the peat to be used for making the fodder before mixing it with the molasses of its contents of acid by adding soda lye in such a quantity as is necessary to produce a quite weak alkaline reaction. I then mix with molasses the peat thus prepared and obtain a fodder which can no longer exercise the above mentioned disadvantageous effects. The lactic acid or the like freshly formed for any reason after the manufacture of the food mixture on the contrary is kept with its action promoting digestion. If on the contrary, according to the well-known processes only the finished food mixture is treated with alkalis, *e. g.* lime, this effect is not obtained. The alkali added in this state first binds the free acids contained in the real food (molasses, etc.), as *e. g.* lactic acid, and only when a further excess of alkali would be added, also the humic acids of the peat would be neutralized. But for this purpose an excess of alkali much too great for the agreeable taste or flavor of the fodder is required, especially as saccharates are simultaneously formed which likewise bind a part of the added alkali. This is very particularly observed when, as is generally the case in practice, lime is used for neutralizing the finished food mixture. Firstly the lime is difficultly soluble, and for this reason it can act only exteriorly and cannot penetrate thoroughly into the entire mass. Secondly saccharate of lime is formed simultaneously, which, as is well-known, is also a difficultly soluble compound which in addition envelops the mass and renders difficult the further penetration of lime. This explains why in the attempts to neutralize the finished food mixture non-successes were always obtained, as clearly stated, for example, by Dr. Gonnermann in his publication (*Deutsche Zucker-Industrie* 1901, vol. 26, p. 457 ff.). Quite otherwise is it in the process according to my invention. I intimately mix the alkali in the form of dilute soda lye directly with the peat, so that the entire acid of the peat can be bound with certainty. I preferably add in addition a small excess of alkali.

After intimately mixing the soda lye with the peat, according to my invention I may for the most part remove the excess moisture and simultaneously the humates passed into solution. For this purpose any form of pressure or suction, *e. g.* in a filtering device, may be used; the peat may also be centrifuged or simply be driven under pressure through a worm and the moisture separated thereby. Or the salts may be removed by washing the peat with slightly alkaline water, instead of subjecting it to pressure or suction. After the treatment with soda lye the peat may be dried. The slightly alkaline peat is then mixed with molasses or the like preferably in heat. This may be done, for example, by mixing the cold peat with hot molasses.

The mixed food made according to my process tends much less to form acids subsequently than other foods of this kind made by mixing with acid-reacting peat. This is apparently due to quite different preliminary conditions being made for the bacteria life in the mixed food owing to the previous treatment of the peat with soda lye in small excess, so that when kept in stock for a pretty long time those bacteria obtain the upper hand which favor less the production of lactic or similar acids. In this manner it is possible to obtain a mixed food not having the injurious action of the humic acids of the peat, but containing lactic acid in small quantities promoting digestion.

Having now described my invention what I claim and desire to secure by Letters Patent of the United States is:

1. A process of manufacturing a fodder composed of peat and molasses and having an admixture of alkali, consisting in the peat being made very slightly alkaline by an admixture of soda lye before mixing it with the molasses etc., so that the acids contained in the peat completely disappear as such, before the peat is mixed with the molasses and other food stuffs and subsequently mixing the thus prepared peat with molasses.

2. A process of manufacturing a fodder composed of peat and molasses and having an admixture of alkali, consisting in firstly making the peat very slightly alkaline by an admixture of soda lye, then partially removing the liquid therefrom and the salts contained in this liquid and hereafter mixing the thus prepared peat with molasses.

In testimony whereof I have hereunto set my hand in presence of two subscribing witnesses.

EDUARD JOSEPH.

Witnesses:
 WOLDEMAR HAUPT,
 HENRY HASPER.